Jan. 17, 1928. 1,656,575
H. G. STONE ET AL
MANUFACTURE OF USEFUL PRODUCTS BY MEANS OF FRIEDEL AND CRAFTS REACTION
Filed Dec. 28, 1923
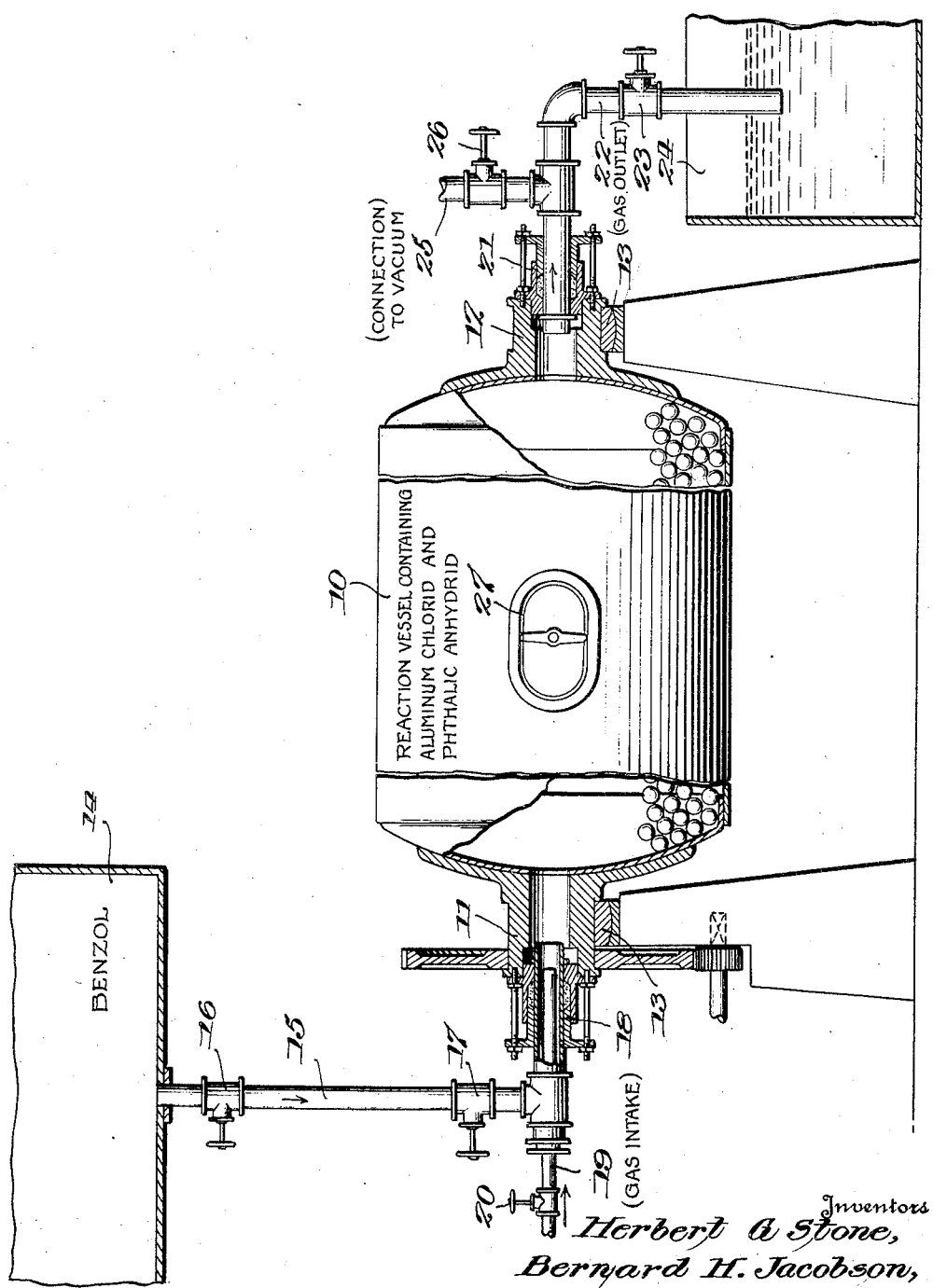
Inventors
Herbert G. Stone,
Bernard H. Jacobson,
By Steward & McKay
Their Attorneys Patented Jan. 17, 1928.

1,656,575

UNITED STATES PATENT OFFICE.

HERBERT G. STONE AND BERNARD H. JACOBSON, OF CHARLESTON, WEST VIRGINIA, ASSIGNORS TO E. C. KLIPSTEIN & SONS COMPANY, OF NEW YORK, N. Y., A CORPORATION OF NEW JERSEY.

MANUFACTURE OF USEFUL PRODUCTS BY MEANS OF FRIEDEL AND CRAFTS REACTION.

Application filed December 28, 1923. Serial No. 683,242.

This invention relates to improvements in manufacture of useful products by means of Friedel and Crafts reaction; and it relates more particularly to processes in which products useful in the manufacture of dyestuffs are synthetically prepared by reaction between an aromatic compound and another compound (either aromatic or not) in the presence of anhydrous aluminum chlorid under such reacting conditions that the aluminum chlorid compound of a desired resultant aromatic derivative is obtained in a simpler and more economical manner than has been possible heretofore.

As will appear hereinafter, the invention is broadly applicable to syntheses involving the Friedel and Crafts reaction. One of its most important practical applications at the present time is for the synthetic production of an intermediate, namely o-benzoyl-benzoic acid, from which anthraquinone can be made in accordance with known methods. This particular phase of the broad invention will therefore be more particularly emphasized in the following description by way of a concrete explanatory example typically illustrating the underlying principles involved.

One of the important known commercial methods of manufacturing anthraquinone involves as its first stage the preparation of the intermediate product o-benzoyl-benzoic acid by reaction between benzol, phthalic anhydrid and anhydrous aluminum chlorid, giving an aluminum chlorid compound of o-benzoyl-benzoic acid, which, upon treatment with water, acid or alkali, breaks down yielding o-benzoyl-benzoic acid or its salts. The second stage of this manufacturing method involves dehydrating the o-benzoyl-benzoic acid, as by heating under proper conditions, to produce anthraquinone. The present invention has to do more particularly with improvements in carrying out the first stage of this general method above outlined.

Heretofore, the first stage of the aforesaid method of making anthraquinone has presented many difficulties. According to the procedure heretofore in general use, it has been necessary to so charge the benzol, phthalic anhydrid and aluminum chloride into the reaction vessel that serious trouble is encuntered from fuming. Even if one of the solids (phthalic anhydrid or aluminum chlorid) is run into the reactor in a part of the solvent (benzol), the operation is still difficult. The closed kettle or reactor is equipped with stirring means and a reflux condenser, and heat is applied to the reactor. Although the reaction goes smoothly after charging is complete, the reaction mass gradually becomes thick and it is practically impossible to successfully discharge it into another vessel for further treatment. Moreover, the breaking down of the resultant aluminum chlorid compound to give o-benzoyl-benzoic acid, whether water, or aqueous acid or alkali be used for this purpose, together with the subsequent distillation of the large excess of benzol employed in this prior known method, involves great technical difficulties due particularly to the large volumes of hot, wet hydrochloric acid gas evolved from hydrolysis of the aluminum chlorid. The corrosive action is so extreme that the apparatus problem becomes serious. Even lead linings in the reactors do not withstand this excessive corrosive action, and as a consequence the extensive repairs necessitated, coupled with resultant loss of time due to shut-downs, makes this method of operation very expensive.

It is a general object of the present invention to avoid the difficulties inherent in the prior known method hereinabove outlined by providing a novel process which, besides being simpler and more readily carried out, is also characterized by greater economy of operation and larger yield of the desired products. In proceeding in accordance with the invention, the phthalic anhydrid and aluminum chlorid are thoroughly commingled in a suitable reactor, most desirably in a rotary mill which grinds these non-reacting solid materials into fine powder and thus brings them into very intimate contact in a substantially uniform mixture. The rotary mill, which is desirably of the ball-mill type, is provided with inlet and outlet pipes for liquid and gases and with suitable closures, so that it constitutes a closed reactor. Either during or after thorough mixing of the non-reacting solid reagents in the mill, the benzol can then be introduced through a suitable inlet pipe without stopping rotation of the mill. The resultant fumes, including substantially dry hydrochloric acid gas, are lead away through a suitable outlet pipe and absorbed in water or otherwise disposed of without escaping into the atmosphere. Rotation of the grinding mill is continued, and after the reaction is substantially complete, any excess of benzol in the pasty reaction mass can be evaporated by passing a current of an inert gas, such as substantially dry air, through the rotating mill. As the operation continues, the reaction mass gradually becomes dry and is finely powdered by the action of the grinding balls. The product obtained in this dry pulverulent form constitutes a new article of manufacture. It probably has the constitution:

$$C_6H_5Al_2Cl_5C_6H_4(CO)_2O$$

In a specific example, using the apparatus that is more or less diagrammatically illustrated in side elevation in the accompanying drawing, the procedure may be as follows: Into a suitable reactor, in this instance a horizontal rotary ball mill 10, which is about ten feet long and three feet in diameter, are charged 400 pounds of phthalic anhydrid and 800 pounds of anhydrous aluminum chlorid. This mill has hollow trunnions 11 and 12, suitably mounted for rotation in bearings 13. The rotary mill is arranged to be rotated from a suitable source of power through suitable reduction gearing at a suitable speed which may desirably be about 23 R. P. M. From a storage tank 14 for benzol, a pipe 15, valved at 16 and 17, extends through stuffing box 18 into hollow trunnion 11 aforesaid, whereby benzol may be run into the ball mill. An air or gas supply pipe 19, valved at 20, leading from any suitable source of air under pressure, enters pipe 15 and extends axially therewithin for conducting air into the ball mill through trunnion 11. The opposite hollow trunnion 12 is also provided with a stuffing box 21 through which extends a gas offtake pipe 22, valved at 23, said pipe leading to gas-absorbing means comprising in this instance a suitable vessel 24 containing water below the surface of which the offtake pipe discharges. A branch pipe 25, valved at 26, is connected to an air pump or other vacuum-producing means (not shown).

The charge of phthalic anhydrid and anhydrous aluminum chlorid having been placed in the ball mill and the man-head closure 27 having been secured in position, valves 20 and 26 being closed and valve 23 open, the mill is rotated and 400 pounds of benzol are run into the mill from the storage or supply reservoir 14. The reaction starts immediately and HCl gas is evolved, said gas passing out of the mill through pipe 22 and being absorbed in water in container 24. After all the benzol is added, the mill is advantageously rotated for several hours longer to ensure complete contact and reaction as follows:

$$C_6H_4(CO)_2O + C_6H_6 + Al_2Cl_6 = \\ C_6H_5Al_2Cl_5C_6H_4(CO)_2O + HCl.$$

The rotary effect and the grinding action of the balls thoroughly mixes the reactive compounds and favors substantially complete reaction. The material in the mill having become a pasty mass, the valve 23 is now closed and the connections to air and vacuum are established by opening valves 20 and 26, respectively, rotation of the mill being continued meanwhile. The resultant passage of air through the mill evaporates and removes any excess benzene (benzol) remaining therein, the pasty residue in the mill gradually solidifying and being ground up by the iron balls to a fine powder. The yield amounts in a typical instance to approximately 1,343 pounds.

It is to be noted that the hydrochloric acid gas evolved in the reactor during the operation above described is substantially dry and therefore does not attack the metal of the mill or grinding balls which may therefore be iron or the like. The air or other inert gas passed through the mill to drive off excess benzol should not contain moisture to such an extent as to render the hydrochloric acid gas actively corrosive. To this end such air or gas may be preliminarily dried, if necessary or desirable, before passing it into the reactor.

The reaction mass having been ground to a substantially dry powder as above described, the mill is then stopped, the manhead 27 is removed and a grating substituted therefor, and the mill is emptied of its contents. For example, the material may be emptied into a hopper and thence into barrels or other containers for storage or shipment. Treatment of this novel pulverulent intermediate by dropping the same into dilute hydrochloric acid results in splitting off aluminum chlorid and producing o-benzoyl-benzoic acid, probably according to the following reaction:

$$C_6H_5Al_2Cl_5C_6H_4(CO)_2O + HCl = \\ C_6H_5COC_6H_4COOH + Al_2Cl_6.$$

The crude o-benzoyl-benzoic acid thus produced is separated from the aluminum chlorid solution by filtration and is then dried for use, in this instance for use in the manufacture of anthraquinone. The yield of o-benzoyl-benzoic acid under the conditions assumed amounts in a typical instance to approximately 742 pounds.

It will be observed that the novel process hereinabove described has a number of very important advantages over prior practice:

In the first place the process heretofore in use has required from three to seven parts by weight of benzene (benzol) to each part of phthalic anhydrid. In order to render the process commercial, it has therefore been necessary to recover this very large excess by steam distillation and to dry the recovered benzene for re-use. The present invention renders all this unnecessary, because by the new process it is possible to get thorough contact with only one part of benzene to each part of phthalic anhydrid. This amount of benzene is still slightly greater than is required by theory, but the excess is so slight that, even if it is allowed to go to waste, the loss amounts to less than the losses involved in the old process requiring recovery.

The old process requires steam heating and refluxing in carrying out the reaction. In the new process no heating is required and a substantial economy is thereby effected, not to mention the fact that the operation is also simplified.

In the old process, after the reaction is complete, it is necessary to add aqueous alkali or acid directly to the reactor in order to break down the aluminum chlorid compound of o-benzoyl-benzoic acid and to render the discharging of the reactor feasible. It is this step, together with the subsequent step of steam distilling the resultant mass to remove the large excess of benzene, which is so destructive to the apparatus. This step is completely eliminated in the new process. The elimination of this principal item of repair by the new process cuts the maintenace cost to a minimum and makes it feasible to maintain substantially continuous operation and production.

In the process heretofore commonly used, one of the solid reagents and the liquid reagent were first charged into a reactor and then the other solid reagent was added slowly in the face of evolved HCl gas. According to the new process, by charging in the non-reacting reagents (both solids in this instance) before adding the reactive liquid reagent, substantially all fuming of an obnoxious character is eliminated and the technical operation of the process is thereby greatly simplified.

Operation on a commercial scale for a substantial period of time shows that the new process averages about ten per cent higher yields than the old process.

Since the new process is substantially anhydrous until after the Friedel and Crafts reaction is completed and the aluminum chlorid compound is discharged from the reactor, the necessity for having steam and water connections to the reactor is done away with and the danger of leaky steam or water valves spoiling a batch is entirely eliminated.

While the new process has been described with particular reference to the manufacture of an intermediate useful for production of anthraquinone, it can be extended in general with similarly satisfactory results to the carrying out of other syntheses involving the Friedel and Crafts reaction, with such minor modifications in detailed procedure as may be occasioned by the difference in the character of the reagents or the reacting materials involved in any given case. For example, the process can be employed for the manufacture of derivatives of anthraquinone, such as methyl-anthraquinone, chloranthraquinone and the like; also in general for the manufacture of useful products by the Friedel and Crafts reaction where the reagents comprise anhydrous aluminum chlorid, an aromatic compound reactive therewith, and another organic compound relatively non-reactive toward aluminum chlorid. Examples of such useful products are acetophenone, methyl-acetophenone benzophenone, etc. In the manufacture of methyl-anthraquinone, for instance, it is only necessary to substitute the homologous liquid benzene hydrocarbon, toluene, for benzene in the procedure above described. Where the two reagents other than aluminum chlorid are both liquids, as is the case in the preparation of acetophenone and benzophenone, for example, the materials initially charged into the rotary mill should be anhydrous aluminum chlorid and the liquid reagent that is relatively non-reactive therewith, such liquid being acetyl chlorid, for example, in the one case, and benzoyl chlorid in the other; after which benzol is run into the reactor as already described for the manufacture of o-benzoyl-benzoic acid. For the sake of a generic term, the term acidyl compound may be conveniently employed to include such compounds as phthalic anhydrid, acetyl chlorid, benzoyl chlorid, and the like. It is evident, however, that the compound to be employed in the synthesis with the benzol or other aromatic compound is not necessarily an acidyl compound.

The term "aroyl" will be used to designate generically the grouping 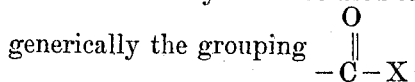 in which X is an aryl radicle such as phenyl, tolyl, naphthyl, or the like.

It is to be understood that a practical detailed procedure is hereinabove set forth and descriptive legends appear on the drawing solely by way of an explanatory example to enable a clear understanding of the principles upon which the invention is based, but that the invention, broadly considered, is not restricted to such details, being susceptible of considerable variation while still realizing in whole or in substantial measure the benefits and advantages aforesaid.

What is claimed is:

1. In the manufacture of intermediates useful in the preparation of anthraquinone dyestuffs, the process which comprises grinding together phthalic anhydrid and anhydrous aluminum chlorid and introducing a liquid benzene hydrocarbon into the mixture, leading off resultant reaction fumes, and evaporating off excess of said benzene hydrocarbon while continuing the grinding to obtain a substantially dry, finely divided solid reaction product.

2. In the manufacture of intermediates useful in the preparation of anthraquinone dyestuffs, the process which comprises grinding together a charge comprising phthalic anhydrid, anhydrous aluminum chlorid, and a liquid benzene hydrocarbon, until the reaction is substantially complete, and evaporating off excess of said benzene hydrocarbon while continuing the grinding to obtain a substantially dry, finely divided product.

3. In the manufacture of useful benzol derivatives, the process which comprises grinding a mixture of phthalic anhydrid and anhydrous aluminum chlorid and introducing benzol into the mixture, continuing the grinding for several hours, evaporating off excess benzol, and obtaining the resultant aluminum chlorid compound of ortho-benzoyl-benzoic acid in substantially dry and finely divided solid form.

4. In the manufacture of useful benzol derivatives, the process which comprises grinding a mixture of anhydrous aluminum chlorid with phthalic anhydrid while introducing benzol into the mixture, leading away resultant reaction fumes, and evaporating excess benzol substantially without introducing moisture into the reaction mass, the grinding being continued until the reaction mass is reduced to substantially dry pulverulent condition.

5. In the manufacture of useful benzol derivatives, the process which comprises charging phthalic anhydrid and anhydrous aluminum chlorid into a rotary grinding mill, then charging benzol into the mill, rotating the mill to effect intimate contact of the charged materials while leading away resultant reaction fumes, continuing rotation of said mill and passing a current of a gas therethrough until the excess of benzol is substantially removed and the reaction mass has been reduced to finely divided solid condition.

6. The process as claimed in claim 3, further characterized by the fact that the reacting ingredients are employed in the approximate proportions, by weight, of 1 part phthalic anhydrid, 2 parts anhydrous aluminum chlorid, and 1 part benzol.

7. The process as claimed in claim 4, further characterized by the fact that the reacting ingredients are employed in the approximate proportions, by weight, of 1 part phthalic anhydrid, 2 parts anhydrous aluminum chlorid, and 1 part benzol.

8. The process as claimed in claim 5, further characterized by the fact that the reacting ingredients are employed in the approximate proportions, by weight, of 1 part phthalic anhydrid, 2 parts anhydrous aluminum chlorid, and 1 part benzol.

9. In the manufacture of useful products by the Friedel and Crafts synthesis, where the reagents comprise anhydrous aluminum chlorid, an aromatic compound reactive therewith, and another organic compound relatively non-reactive toward aluminum chlorid but capable of taking part in the desired synthesis, the process which comprises commingling anhydrous aluminum chlorid with said relatively non-reactive compound, then adding said aromatic compound to the mixture under reacting conditions such that the reaction mass is at least partially liquid, and reducing the reaction mass to substantially dry comminuted condition while leading away volatilized matter.

10. In the manufacture of useful benzene derivatives by means of the Friedel and Crafts reaction, the process which comprises thoroughly commingling anhydrous aluminum chlorid and an organic acidyl compound capable of functioning in said reaction, introducing into the mixture a benzene hydrocarbon whose derivative it is desired to produce, and grinding the resultant mass under anhydrous conditions and without application of heat to effect the desired reaction.

11. In the manufacture of useful products by the Friedel and Crafts reaction from a liquid compound of the benzene series and an organic acidyl compound capable of functioning in said reaction, which comprises commingling anhydrous aluminum chlorid with such acidyl compound and adding to the mixture such liquid compound of the benzene series, agitating the mixture, evaporating surplus liquid therefrom, and comminuting the resultant solid aluminum chlorid compound.

12. As a new article of manufacture, an aluminum chlorid compound of an aroyl-benzoic acid, in the form of a substantially dry, finely divided solid.

13. As a new article of manufacture, an aluminum chlorid compound of an o-aroyl-benzoic acid, in the form of a substantially dry, finely divided solid.

14. As a new article of manufacture, an aluminum chlorid compound of o-benzoyl-benzoic acid, in the form of a substantially dry, finely divided solid.

In testimony whereof we hereunto affix our signatures.

HERBERT G. STONE.
BERNARD H. JACOBSON.